United States Patent

[11] 3,581,006

[72] Inventor Jacob L. Wallace, Jr.
Springfield, Va.
[21] Appl. No. 715,402
[22] Filed Mar. 22, 1968
[45] Patented May 25, 1971
[73] Assignee The Susquehanna Corporation
Fairfax County, Va.

[54] DUPLEX CONTROL CIRCUIT
7 Claims, 3 Drawing Figs.

[52] U.S. Cl. .......... 178/58
[51] Int. Cl. .......... H04l 5/14
[50] Field of Search .......... 178/58, 59; 179/170.2, 170.6

[56] References Cited
UNITED STATES PATENTS

| | | | |
|---|---|---|---|
| 1,881,801 | 10/1932 | Mathes | 179/170.2 |
| 3,215,789 | 11/1965 | Hunter et al. | 179/170.6 |
| 3,496,293 | 2/1970 | Avery et al. | 178/58 |

*Primary Examiner*—Kathleen H. Claffy
*Assistant Examiner*—David L. Stewart
*Attorney*—Martha L. Ross

ABSTRACT: An example of the duplex control circuit is a circuit formed of two logic flip-flops connected between two channels of a half-duplex telegraph circuit. This duplex control circuit functions to prevent reflections or feedback of the transmissions into the inactive channel. Each channel is controlled by one of the flip-flops whereby the flip-flop controlling the inactive channel is set and locks this channel to a marking condition whenever a spacing signal is processed by the active channel and does not become reset until this spacing signal terminates at the input to the inactive channel.

| INPUTS | | OUTPUTS |
|---|---|---|
| A | B | C |
| M | M | S |
| M | S | M |
| S | M | M |
| S | S | M |

INVENTOR

J. LIGHTSEY WALLACE, JR.

BY Tipton D. Jennings

ATTORNEY

DUPLEX CONTROL CIRCUIT

BACKGROUND OF THE INVENTION

The present invention relates to a duplex control circuit for use with telegraph and data transmission systems.

A feature of this invention is the prevention in a data transmission system of feedback or reflection between the channels or legs of such a system by the provision of a "double" duplex control circuit. By "double" is meant the capability to isolate transmission in either direction so that only one direction of transmission occurs between any two channels of the system.

SUMMARY

A particular object of the present invention is to provide an improved duplex control circuit, as described in the preceding paragraph, which is capable of isolating transmission to one direction even in the presence of delayed signals which are caused by propagation delays or intentionally by the use of signal regeneration in the transmission system.

Another object of the present invention is to provide an improved duplex control circuit having a memory or storage capability whereby it remains in its isolation mode until such time as the undersired signal terminates, even though such signal is delayed.

Other objects an advantages will become apparent from a reading of the specification in combination with the accompanying drawings.

Briefly, the present invention is directed to a duplex control circuit for use in a two-channel data transmission system, said circuit serving to isolate the inactive channel from data transmissions in the active channel. This circuit comprises two bistable circuits, each of which has an input connected into each of the two channels. Each bistable circuit therefore receives an input signal from each channel so that the state of each circuit is controlled according to the signals present in each channel. The output of each bistable circuit is connected back into one of the channels by means of control device such as a gate, the result being to isolate the inactive channel from the effect of transmissions in the active channel in response to activation of one of the bistable circuits.

DESCRIPTION OF THE PREFERRED EMBODIMENT

Figure 1:
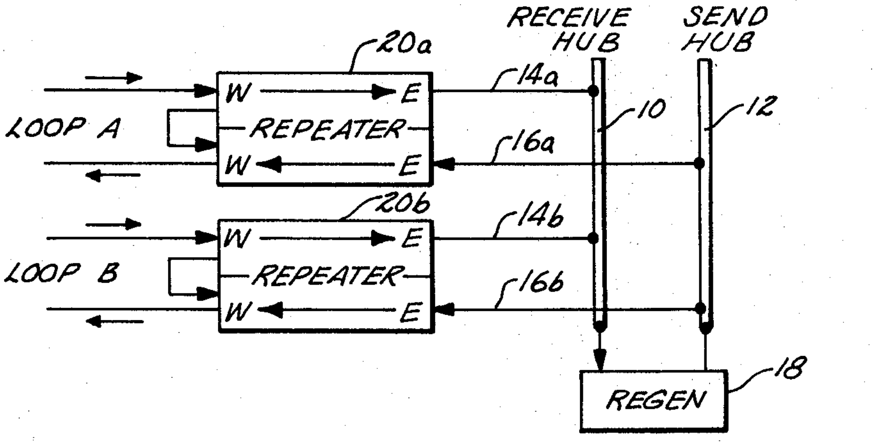
FIG. 1 shows a block diagram of a hub circuit which is used to aid in understanding the present invention.

In FIG. 1 there is shown in block diagram form a telegraph system for connecting loop customers into a hub circuit, the purpose of this FIGURE being to aid in the understanding of the invention, as later described. The hub circuit permits transmissions from one loop to be sent to all other loops connected into the hub, and also to any other hub circuits which may be connected to this hub.

The hub consists of a receive hub conductor 10 and a send hub conductor 12. Each receive leg or channel 14 is connected to the receive hub 10, and each send leg or channel 16 is connected to the send hub 12.

A conventional regenerative repeater 18 is connected between the receive and send hubs. This regenerative repeater reshapes the pulse trains applied by the receive hub 10 and retransmits the pulse train in undistorted form onto the send hub 12. Because of the operation of the regenerative repeater, the regenerated pulse train is customarily delayed one-half of a unit pulse length with respect to the input pulse train.

Connected between the hub circuit and each of a plurality of loops, two of which are shown here, are repeaters 20. The purpose of these repeaters, by way of illustration, is to isolate the loops from the hub circuit or to convert the current or voltage levels between the loops and the hub circuit.

The system shown in FIG. 1 is designed for half-duplex operation in which only one loop can send (transmit) at any one time while the rest of the loops receive. For example, if loop A is transmitting, the generated pulse train is applied into the West-to-East (W/E) leg of repeater **20*a*. Line 14*a* applies the output of repeater 20*a*, which is a repeated form of the input, to receive hub 10. This pulse train goes to regenerative repeater 18 where it is reshaped and applied onto send hub 12**.

From the send hub 12 this pulse train is applied to each leg 16 and thereby to the East-to-West (E/W) leg of each repeater 20. Except for loop A, each of the remaining loops such as loop B will now apply a repeated pulse train from the output of the E/W leg of its repeater 20 into its associated loop where it will be received by each customer in the loop.

The operation of FIG. 1 on a pulse-by-pulse basis is that if a loop is idle or in a marking pulse condition, the loop is completely closed and a predetermined current level exists in the loop. This current level also appears at the West input of the W/E leg of each repeater 20. A predetermined voltage level, corresponding also to a marking or idle condition appears at each line 14, receive hub 10, send hub 12, and each line 16.

When any loop goes spacing, the loop is either opened or a new current level is provided. Assuming here that loop A is broken, the absence of current is applied to the W/E input of repeater **20*a*. A new voltage level appears on line 14*a*, receive hub 10, send hub 12 (after a one-half pulse delay) and each line 16**. In loop B and in all other loops tied into the hub circuit, except for loop A, a spacing condition is transmitted by the E/W repeater into the loop. The customers in these loops will receive a spacing pulse condition.

In loop A, with reference to the aforedescribed example, if a spacing condition is allowed to propagate from the send hub 12 through the E/W leg of repeater **20*a*** back into the loop, an open condition will exist which remains even though the transmitter (not shown) in loop A is subsequently closed to terminate the spacing pulse. Thus, loop A remains open or spacing and this condition will hold the other loops also via the hub circuit connection, resulting in an inoperative telegraph system.

Likewise, if loop A is transmitting a space which is propagated to the other loops such as loop B, this spacing or open signal can propagate through loop B and be applied to the West side of the W/E leg of repeater **20*b*. If this space is allowed to be reflected through the W/E leg into the receive hub 10, it will also appear on the send hub 12 after passing through regenerator 18** and be applied to the other loops, including loop A once that loop returns to the marking condition. The result will again be an inoperative telegraph system because the entire circuit will be in an open condition. Control circuitry is necessary to prevent reflection or retransmission of spacing signals back through one leg when the opposite leg is actively transmitting, particularly where any delays occur in signal propagation. To accomplish this end, a double duplex control circuit for use in a half-duplex system is next described.

Figure 2:
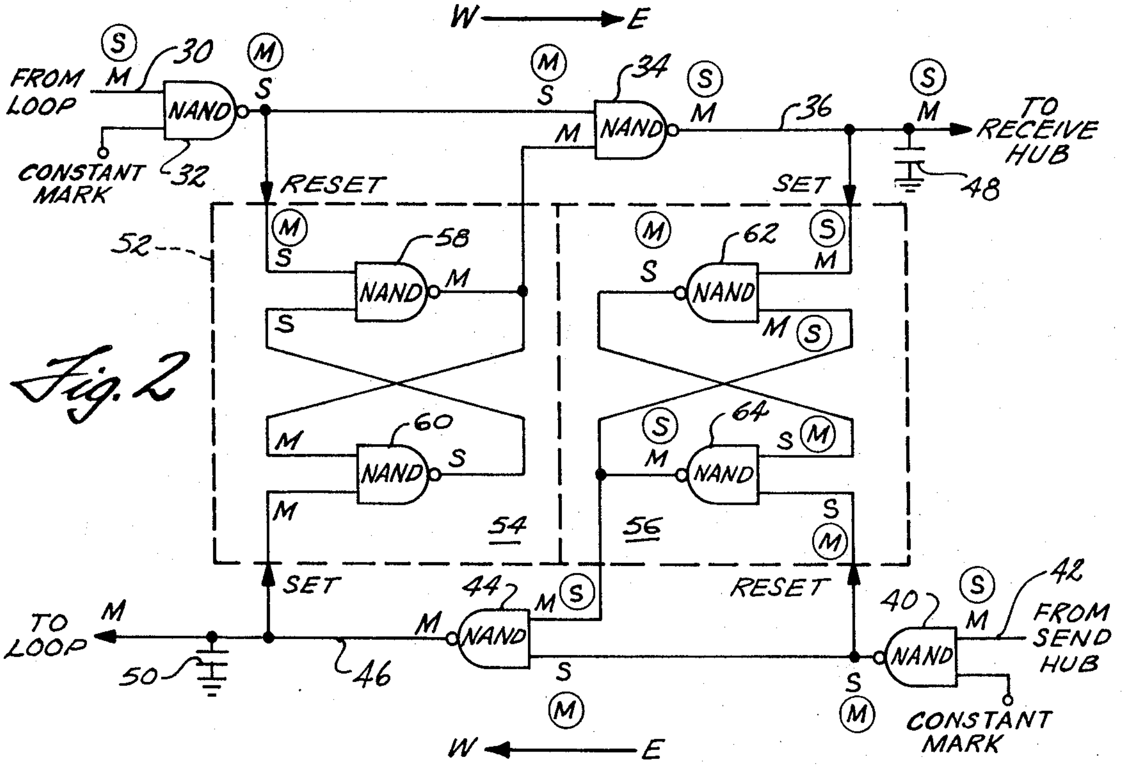
FIG. 2 is a schematic showing of the present invention in conjunction with repeater circuitry.

In FIG. 2 there is shown the construction of a repeater 20 having W/E and E/W channels. The conventional interface circuitry which is connected between the repeater, as shown in this FIGURE, and the loop and hub, has been omitted. NAND logic is used in this preferred embodiment, although it is to be understood that other logic forms can be utilized.

In the W/E channel, the input from the loop is applied by line 30 to NAND gate 32. The second input to this NAND gate is connected to a marking (M) level, and NAND gate 32 functions as an inverter. The output of NAND gate 32 is connected to the input to NAND gate 34. The output of NAND gate 34 is applied by line 36 to the receive hub. When this W/E channel is active and transmissions are applied to inverter 32, the input pulses applied on line 30 are repeated on output line 36.

The E/W channel is the same in construction and operation as the W/E channel and includes an inverter 40 connected to receive an input from the send hub via line 42. The second input of this inverter is connected to a marking level. The output of this inverter is connected to a marking level. The output of inverter 40 is connected to the input of NAND gate 44 whose output, in turn, is applied by line 46 towards the loop. Capacitors 48 and 50 are connected respectively to output lines 36 and 46.

The duplex control circuit 52 contains two bistable circuits which are shown as logic flip-flops 54 and 56. In flip-flop 54, the Set input is connected from line 46 in the E/W channel, and the Reset input is connected from the output of inverter 32 in the W/E channel. Flip-flop 54 is formed of two Nand gates 58 and 60, connected as a conventional SR flip-flop. The output of flip-flop 54 is taken from the output of NAND gate 58 and of flip-flop 54 is taken from the output of NAND gate 58 and applied to the second input of NAND gate 34 in the W/E channel.

Flip-flop 56 is also constructed as a conventional SR flip-flop having two NAND gates 62 and 64. The Set input is connected from output line 36 in the W/E channel and the Reset input is connected from the output of inverter 40 in the E/W channel. The output of flip-flop 56 is taken from the output of NAND gate 64 and applied to the second input of NAND gate 44 in the E/W channel.

Figure 3:
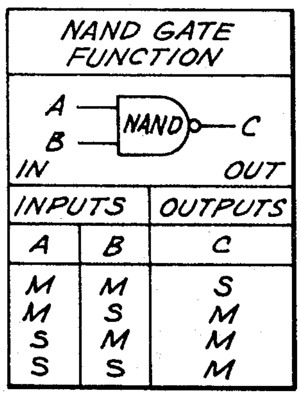
FIG. 3 is a truth table of NAND logic.

Both the W/E and E/W channels operate identically and only an explanation of one direction of transmission is necessary to obtain an understanding of how the duplex control circuit 52 operates to prevent reflection or retransmission of spacing signals through an inactive channel. To assist in an understanding of the operation of the NAND gates in response to Mark and Space inputs, a truth table is shown in FIG. 3. As shown, a Space at either input causes a Mark at the output. If two Marks are present at the input, a Space occurs at the output.

Assume that the W/E channel is actively transmitting. The duplex control circuit 52 now functions to keep the output of the E/W channel marking even under those conditions where a delay of one-half of a unit pulse or more occurs between the time a pulse transition leaves on line 36 and circulates to inverter 40 in the E/W channel. Initially, when both channels are idle (or marking), the signal conditions throughout the circuit are shown in FIG. 2 by an uncircled M for marking and an uncircled S for spacing. Flip-flops 54 and 56 are in the Reset state.

When a spacing pulse is received by inverter 32, its output goes marking. (Note that a circled M and a circle S are used to show the changes in signal condition throughout the circuit in response to a spacing signal at the West input.) At NAND gate 34, two marking inputs are present and the output of this gate goes spacing. A spacing signal is now sent out to the receive hub. The marking output of inverter 32 is also applied to NAND gate 58 in flip-flop 54; however, the second input to this gate remains spacing and its output stays marking. Therefore, the change in signal in the loop and thereby in the W/E channel has no effect on flip-flop 54 in duplex control circuit 52.

With the W/E repeater channel active, flip-flop 56 becomes activated to lock the output of the inactive E/W repeater channel in a marking or closed-contact state. This control begins by the application of the spacing signal on line 36 to the Set input of flip-flop 56 which changes the output of NAND gate 62 from space to mark. One input to NAND gate 64 now becomes a mark.

After the spacing signal circulates through the hub circuit including the regenerative repeater 18 shown in FIG. 1, it arrives on line 42 and is applied to inverter 40. The output of this inverter goes to mark which is applied both to NAND gate 44 and to flip-flop 56. In NAND gate 64 of this flip-flop, two marking inputs are now present and its output goes spacing. This spacing signal is applied to NAND gate 62, where it has no effect, and to NAND gate 44. Because at least one of the inputs to NAND gate 44 is a space, even though the signals at each input have just been reversed, the output of the E/W channel on line 46 remains locked at Mark.

For a very brief propagation interval of approximately 25 nanoseconds which it took for the Mark signal to activate NAND gate 64 and apply a space to the upper input of NAND gate 44, there were two marking signals present at the input of NAND gate 44. Under such conditions its output would normally change to a space. However, at this time, capacitor 50 operates in conjunction with circuit resistance in gate 44 to prevent line 56 from going spacing, and a continuous marking signal remains. No adverse effect occurs in the loop.

When the spacing signal terminates in the loop and the input on line 30 returns to a mark, the output on line 36 also goes marking. This marking signal is applied to flip-flop 56 but it has no effect on NAND gate 62 because its second input is spacing. This memory feature of the duplex control circuit is significant because were flip-flop 56 now to reset, NAND gate 44 would switch to a spacing output because a spacing condition still exists at the input to the E/W channel. Therefore, it is not until the marking signal on line 36 has circulated to the E/W repeater, accompanied by any of the aforedescribed delays, that flip-flop 56 can possibly reset. This resetting occurs as follows: when the output of inverter 40 ultimately goes spacing, it applies this signal to NAND gate 44 thereby holding the output of the E/W channel at the desired marking condition. This spacing signal from inverter 40 is also applied to the Reset input of flip-flop 56 and changes the output of NAND gate 64 back to mark. Because the lower input of NAND gate 44 has already returned to space, the resetting of this flip-flop cannot affect the output of NAND gate 44 which remains marking.

The marking output of NAND gate 64 is also applied to the input of NAND gate 62 changing its output back to a spacing signal. The circuit of FIG. 2 is now back in its original state where the uncircled letters M and S represent the signal conditions.

If the E/W channel were to become the active repeater, flip-flop 54 in control circuit 52 would be activated, in the same manner as just described for flip-flop 56, to prevent any feedback or reflection through the loop and back to the hub circuit. Again the memory feature of this control circuit comes into play to prevent any premature release of the lock on the W/E channel until the spacing signal has terminated at input line 30 connected to inverter 32. Thus, this control circuit 52 can isolate the inactive channel regardless of the direction of transmission and even though significant delays exist in the signal propagation.

Although this duplex control circuit has been described with respect to a particular half-duplex hub arrangement, it should be understood that this invention is not to be limited to use with this particular hub circuit or the repeaters used therewith. Its function as a control circuit can be utilized in other two-channel or two-legged circuit where a need exists to isolate the active from the inactive channel.

Having now described this invention in detail with respect to a preferred embodiment, changes and modification will suggest themselves to those skilled in the art without departing from the spirit and scope of the invention as set forth in the appended claims.

What I claim is:

1. A duplex control circuit for use in a two-channel, data transmission system, said circuit serving to isolate the inactive channel from data transmissions in the active channel, comprising two bistable circuits, each of said bistable circuits having a separate input connected into each one of the two channels and being responsive to signals received from each of said channels on said inputs such that the state of each of said bistable circuits is controlled by the signal conditions in said channels, each of said bistable circuits further having an output, and means in each channel connected to the output of one of said bistable circuits for controlling the passage of data transmissions through its associated channel in response to the state of the bistable circuit to whose output it is connected, the controlling means in the inactive channel serving to isolate the inactive channel from the data transmissions in the active channel.

2. A duplex control circuit as claimed in claim 1 wherein said controlling means in each channel comprises a gate for the passage of data transmissions therethrough, one input of each gate being connected to the output of a separate one of said bistable circuits, another input of each gate being connected to receive data transmissions in its associated channel the output of the gate in the inactive channel being maintained at a desired signal condition in the presence of data transmissions in the active channel.

3. A duplex control circuit as claimed in claim 2 wherein each of said bistable circuits is a flip-flop, one flip-flop having a set input connected into one channel and a reset input connected into the other channel, and the other flip-flop connected in the opposite manner.

4. A duplex control circuit as claimed claim 3 wherein the set input of each flip-flop is connected to the output of a gate in one channel and the reset input of the same flip-flop is connected at the input of the gate in the other channel.

5. A duplex control circuit as claimed in claim 4 wherein said gate in each controlling means is included in a repeater circuit in the associated channel of the system and said duplex control circuit further comprising an inverter connected at the input to each repeater, the output of the inverter in each channel forming one input to the gate in that channel.

6. A duplex control circuit as claimed in claim 4 wherein each flip-flop is formed of at least two NAND gates, the output of each NAND gate being connected to an input of the other NAND gate, and the output of one NAND gate serving as the flip-flop output.

7. A duplex control circuit as claimed in claim 6 further comprising a capacitor connected at the output of each channel gate to filter transients occurring in each of said channels.

UNITED STATES PATENT OFFICE

CERTIFICATE OF CORRECTION

Patent No. 3,581,006 Dated 25 May 1971

Inventor(s) Jacob L. Wallace, Jr.

It is certified that error appears in the above-identified patent and that said Letters Patent are hereby corrected as shown below:

1. Column 2, line 38, insert --open-- after "also."
2. Column 3, lines 3-4, delete "this inverter is connected to a marking level. The output of".
3. Column 3, line 12, "Nand" should be --NAND--.
4. Column 3, lines 15-16, delete "of flip-flop 54 is taken from the output of NAND gate 58 and".

Signed and sealed this 21st day of December 1971.

(SEAL)
Attest:

EDWARD M.FLETCHER,JR.
Attesting Officer

ROBERT GOTTSCHALK
Acting Commissioner of Patents